(12) United States Patent
Lowry et al.

(10) Patent No.: US 10,666,513 B2
(45) Date of Patent: May 26, 2020

(54) FILESYSTEM SHARE AUTO-DETECT

(71) Applicant: INTERNATIONAL BUSINESS MACHINES CORPORATION, Armonk, NY (US)

(72) Inventors: Debora A. Lowry, Ellensburg, WA (US); Jonathan Mendez Chacon, San Jose (CR); Blanca R. Navarro, Heredia (CR); Jose D. Ramos Chaves, Heredia (CR)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 15/585,703

(22) Filed: May 3, 2017

(65) Prior Publication Data

US 2018/0324046 A1    Nov. 8, 2018

(51) Int. Cl.
*G06F 15/173*   (2006.01)
*H04L 12/24*    (2006.01)
*H04L 29/08*    (2006.01)
*G06F 3/06*     (2006.01)
*G06F 16/13*    (2019.01)
(Continued)

(52) U.S. Cl.
CPC ........ *H04L 41/0873* (2013.01); *G06F 3/0604* (2013.01); *G06F 3/0605* (2013.01); *G06F 3/067* (2013.01); *G06F 3/0632* (2013.01); *G06F 3/0644* (2013.01); *G06F 16/13* (2019.01); *G06F 16/183* (2019.01); *G06F 16/1827* (2019.01); *H04L 41/0806* (2013.01);
(Continued)

(58) Field of Classification Search
USPC ....................................................... 709/225
See application file for complete search history.

(56) References Cited

U.S. PATENT DOCUMENTS 6,389,432 B1    5/2002  Pothapragada et al.
6,834,299 B1 *  12/2004 Hamilton, II .......... H04L 29/06
                                                  370/411
(Continued)

OTHER PUBLICATIONS

Lowry et al., "Filesystem Share Auto-Direct", U.S. Appl. No. 15/855,075, filed Dec. 27, 2017, pp. 1-17.
(Continued)

*Primary Examiner* — Alicia Baturay
(74) *Attorney, Agent, or Firm* — Anthony M. Pallone

(57) ABSTRACT

An embodiment of the invention may include a method, computer program product, and system for network attached storage configuration. The embodiment may include receiving a request, from a network storage administrator, to create a network share on a network attached storage for a network server. Based on the received request, sending an operating system identifier probe to the network server to identify an operating system deployed on the network server. The embodiment may include receiving an identification of the operating system deployed on the network server. Based on the identified operating system deployed on the network server, configuring the network share on the network attached storage. Configuring the network share on the network attached storage may include selecting a network protocol filesystem type compatible with the identified operating system deployed on the network server. The embodiment may include testing compatibility between the network share and network server.

20 Claims, 5 Drawing Sheets

(51) Int. Cl.
*G06F 16/182* (2019.01)
*H04L 12/26* (2006.01)

(52) U.S. Cl.
CPC ......... *H04L 67/1097* (2013.01); *H04L 67/34* (2013.01); *H04L 41/0853* (2013.01); *H04L 43/10* (2013.01)

(56) References Cited

U.S. PATENT DOCUMENTS

| | | | | |
|---|---|---|---|---|
| 6,985,975 | B1* | 1/2006 | Chamdani | 710/55 |
| 7,317,693 | B1 | 1/2008 | Roesch | |
| 7,379,990 | B2* | 5/2008 | Tsao | H04L 41/0813 |
| | | | | 709/223 |
| 7,496,662 | B1 | 2/2009 | Roesch | |
| 7,606,868 | B1* | 10/2009 | Le | G06F 16/10 |
| | | | | 709/211 |
| 7,634,582 | B2* | 12/2009 | Ovadia | H04L 29/06 |
| | | | | 709/249 |
| 7,640,498 | B2* | 12/2009 | Koechley | G06F 16/9577 |
| | | | | 715/255 |
| 7,716,187 | B2* | 5/2010 | Teodosiu | G06F 3/0605 |
| | | | | 707/667 |
| 7,716,742 | B1 | 5/2010 | Roesch | |
| 7,730,175 | B1 | 6/2010 | Roesch | |
| 7,774,391 | B1* | 8/2010 | Le | G06F 16/13 |
| | | | | 707/822 |
| 7,801,980 | B1 | 9/2010 | Roesch | |
| 7,885,190 | B1 | 2/2011 | Roesch | |
| 7,949,732 | B1 | 5/2011 | Roesch | |
| 8,046,477 | B1* | 10/2011 | Arutla | G06F 9/50 |
| | | | | 709/220 |
| 8,161,079 | B2* | 4/2012 | Chen | H04L 41/0893 |
| | | | | 707/802 |
| 8,364,638 | B2* | 1/2013 | Nickolov | G06F 9/4856 |
| | | | | 707/636 |
| 8,499,062 | B2* | 7/2013 | Agetsuma | H04L 29/06 |
| | | | | 709/223 |
| 8,578,002 | B1 | 11/2013 | Roesch | |
| 8,578,374 | B2* | 11/2013 | Kane | G06F 9/45558 |
| | | | | 718/1 |
| 8,898,224 | B2* | 11/2014 | Haugh | G06F 9/5077 |
| | | | | 709/203 |
| 9,075,844 | B1* | 7/2015 | Thayer | G06F 11/3051 |
| 9,075,845 | B1* | 7/2015 | Thayer | G06F 11/3051 |
| 9,087,066 | B2* | 7/2015 | Acharya | G06F 16/164 |
| 9,183,200 | B1* | 11/2015 | Liu | G06F 16/278 |
| 9,367,575 | B1* | 6/2016 | Bromley | G06F 16/2228 |
| 9,430,483 | B1 | 8/2016 | Cowan et al. | |
| 9,471,243 | B2 | 10/2016 | Kumar et al. | |
| 9,495,379 | B2* | 11/2016 | Zhang | G06F 11/1453 |
| 9,785,644 | B2* | 10/2017 | Lam | G06F 16/1752 |
| 9,900,299 | B2* | 2/2018 | Oppenheim, Jr. | G06F 16/282 |
| 10,061,660 | B1* | 8/2018 | Jagannatha | G06F 11/1453 |
| 2002/0082858 | A1* | 6/2002 | Heddaya | G06F 8/61 |
| | | | | 705/26.1 |
| 2010/0106933 | A1 | 4/2010 | Kamila et al. | |
| 2010/0235461 | A1 | 9/2010 | Haba | |
| 2014/0082508 | A1 | 3/2014 | Rajashekar et al. | |
| 2017/0206022 | A1* | 7/2017 | Theinert | G06F 3/0608 |
| 2017/0324574 | A1* | 11/2017 | Huang-Fu | H04L 12/1877 |
| 2018/0359681 | A1* | 12/2018 | Futaki | H04W 48/16 |
| 2019/0179714 | A1* | 6/2019 | Karthikeyan | G06F 11/1464 |
| 2019/0182322 | A1* | 6/2019 | Kumar | G06F 3/0647 |
| 2019/0188314 | A1* | 6/2019 | Mirizzi | G06F 16/285 |

OTHER PUBLICATIONS

List of IBM Patents or Patent Applications to be Treated as Related. Filed Dec. 27, 2017, 2 pages.

Mell et al., "The NIST Definition of Cloud Computing", NIST, Sep. 2011, pp. 1-3, Special Publication 800-145, U.S. Department of Commerce, Gaithersburg, MD.

Stack Overflow, "Autodetect filesystem on mount()", http://stackoverflow.com/questions/11397813/autodetect-filesystem-on-mount, Apr. 18, 2017, pp. 1-2.

IBM: List of IBM Patents or Patent Applications Treated as Related (Appendix P), May 9, 2019, 2 pages.

Pending U.S. Appl. No. 16/390,064, filed Apr. 22, 2019, entitled: "Filesystem Share Auto-Detect", 22 pages.

* cited by examiner

FILESYSTEM SHARE AUTO-DETECT

BACKGROUND

The present invention relates to network attached storage (NAS), and more specifically, to NAS configuration.

Network attached storage is a file-level computer data storage server connected to a computer network providing data access to a heterogeneous group of clients. NAS is specialized for serving files either by its hardware, software, or configuration. NAS is often manufactured as a computer appliance (i.e. a purpose-built specialized computer). NAS implementations typically provide access to files using network file sharing protocols such as NFS or CIFS.

BRIEF SUMMARY

An embodiment of the invention may include a method, computer program product, and system for network attached storage configuration. The embodiment may include receiving a request, from a network storage administrator, to create a network share on a network attached storage for a network server. Based on the received request, the embodiment may include sending an operating system identifier probe to the network server to identify an operating system deployed on the network server. The embodiment may include receiving an identification of the operating system deployed on the network server. Based on the identified operating system deployed on the network server, the embodiment may include configuring the network share on the network attached storage. Configuring the network share on the network attached storage may include selecting a network protocol filesystem type compatible with the identified operating system deployed on the network server. The embodiment may include testing compatibility between the network share and network server.

DETAILED DESCRIPTION

Embodiments of the present invention will now be described in detail with reference to the accompanying Figures.

In an IT infrastructure environment network shares may be implemented through network attached storage (NAS) solutions. NAS storage removes the responsibility of file serving from other servers on the network. During storage administration of the NAS appliance, one of the configuration steps is to select the filesystem type (e.g. CIFS for Windows, or NFS for Linux/Unix/Mac OS) used by the NAS appliance for network file sharing. If there is a mismatched filesystem type between the NAS appliance and a network server, the network server is unable to detect the network share. An undetectable network share can cause considerable troubleshooting delay and confusion as not detecting the network share typically directs a NAS administrator to investigate the network, rather than examine the executed network share configuration steps. Storage administration of the NAS appliance does not provide feedback specifying the operating system deployed on the servers to which the NAS appliance is provisioned.

In an effort to alleviate the risk of configuring a mismatched filesystem type during storage administration of a NAS appliance, network attached storage configuration system 100, described below, performs a method for automatically configuring a network share on a NAS appliance. Upon receiving a request to provision a network share on a NAS appliance, NAS system 100 probes the network server for which the network share is to be provisioned, identifies the operating system deployed on the network server, and automatically selects the filesystem type required for compatibility with the network server based on the network server's operating system. NAS system 100 provides feedback to the administrator concerning the network share request, reduces the time needed to fulfill the request, and reduces human errors related to the fulfillment of the request. Furthermore, NAS system 100 provides full visibility to a NAS administrator of the operating system deployed on a provisioned server and effectively reduces troubleshooting times.

Figure 1:
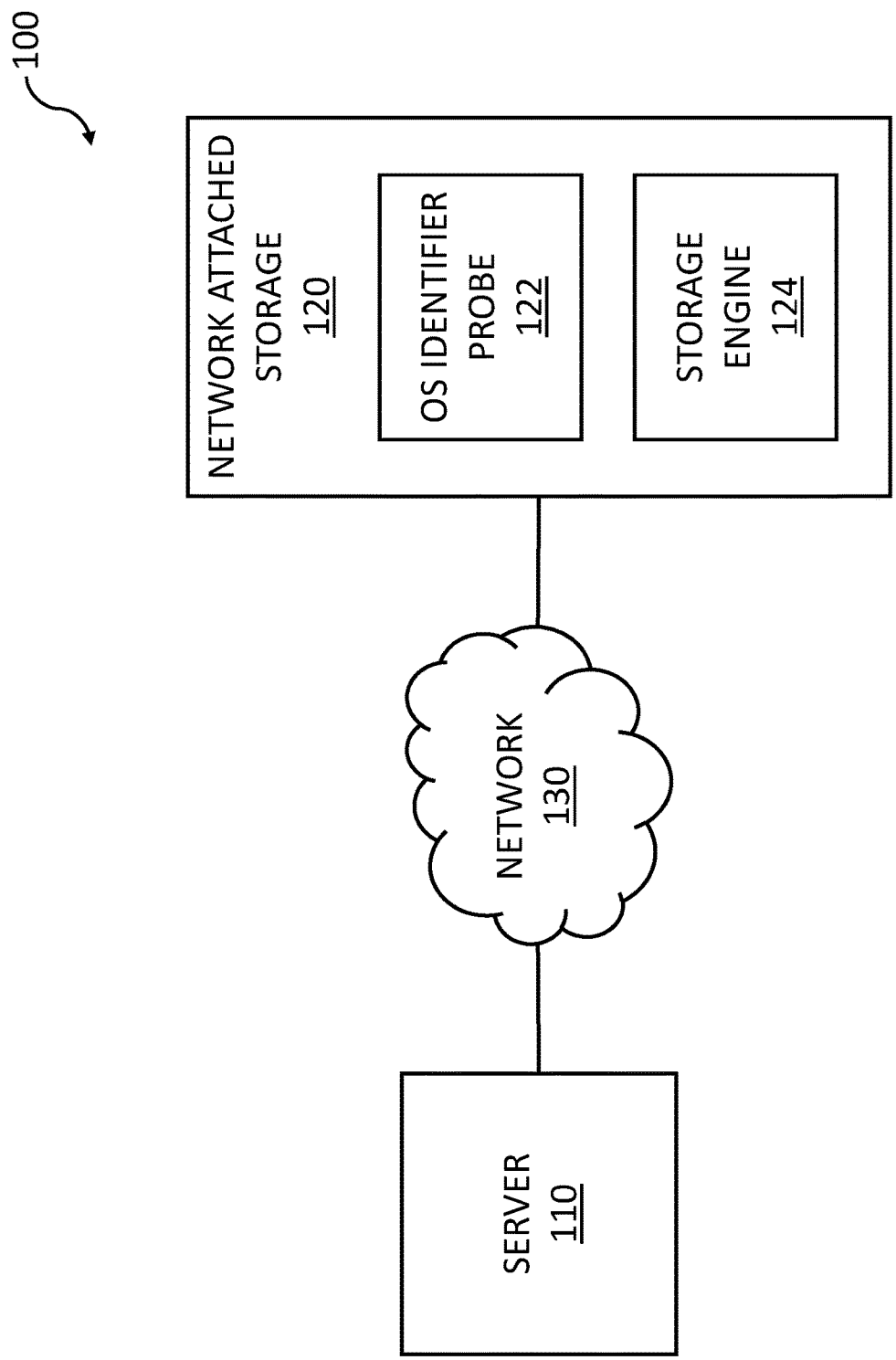
FIG. 1 is a functional block diagram illustrating a network attached storage configuration system, in accordance with an embodiment of the present invention.

FIG. 1 is a functional block diagram illustrating network attached storage configuration system 100, in accordance with an embodiment of the present invention. NAS configuration system 100 may be a distributed communication environment, including server 110 and network attached storage (NAS) 120 interconnected via network 130.

Network 130 may be implemented as, for example, a local area network (LAN), a wide area network (WAN) such as the Internet, or a combination of the two. Network 130 may include, for example, wired, wireless or fiber optic connections. In general, network 130 may be any combination of connections and protocols that will support communications between server 110 and network attached storage 120, in accordance with an embodiment of the invention.

Server 110 may be a desktop computer, a notebook, a laptop computer, a blade, or any other electronic device or computing system capable of sending and receiving data to and from other computing devices such as network attached storage 120 via network 130. Although not shown, optionally, server 110 may include a cluster of servers executing the same software to collectively process and monitor the communications between other computing devices such as NAS 120. In an example embodiment, server 110 may send data to a provisioned share on network attached storage 120, via network 130. Furthermore, in an example embodiment server 110 may also receive data from a provisioned share on network attached storage 120, via network 130. Server 110 is described in more detail with reference to FIG. 3.

Network attached storage 120 may include an operating system (OS) identifier probe 122 and a storage engine 124. NAS 120 may be a desktop computer, a notebook, a laptop computer, a networked computer appliance, or any other networked electronic device or computing system enabling the storage and retrieval of data and capable of hosting storage engine 124. NAS 120 may transmit data to other computing devices to which it is provisioned, such as server 110, that are attached to network 130. Although not shown, optionally, NAS 120 may include a cluster of networked computer appliances executing the same software to collectively process and monitor the data storage and retrieval requests of other computing devices attached to network 130. In an example embodiment, NAS 120 may provide a location for shared storage of computer files that can be accessed by other computing devices attached to network 130, such as server 110. Network attached storage 120 is described in more detail with reference to FIG. 3.

OS identifier probe 122 may be a program, or subroutine contained in a program, that may determine the type of operating system deployed on a host (e.g. server 110), connected to NAS 120 via network 130. OS identifier probe 122 may be implemented as a small computer system interface (SCSI) command signal sent from NAS 120 to a connected server (e.g. server 110) and received back, from the connected server, to NAS 120. OS identifier probe 122 may relay information concerning the operating system deployed on a connected server (e.g. server 110) to storage engine 124. In an example embodiment, OS identifier probe 122 sends a SCSI command signal to server 110, over network 130, to determine the operating system (e.g. Windows, Linux, Mac OS, Unix) deployed on server 110. The SCSI command signal returns to OS identifier probe 122, from server 110, identifying the operating system deployed on server 110. Furthermore, in an example embodiment, OS identifier probe 122 transmits information (i.e. the identified operating system deployed on server 110) to storage engine 124.

Storage engine 124 may be a program, or subroutine contained in a program, that may receive a network share creation request from a NAS administrator, initiate OS identifier probe 122, and, based on the information received from OS identifier probe 122, automatically configure the network filesystem protocol required to set up a network share on NAS 120. The network share may be provisioned to a server (e.g. server 110) connected to NAS 120. Storage engine 124 may also test the compatibility between a provisioned network share and the server (e.g. server 110), and provide feedback to the NAS administrator. The feedback provided by storage engine 124 may include information relating to status of the network share creation request, server OS identification, and compatibility test results. In an example embodiment, storage engine 124 may receive a NAS administrator request to provision a network share on NAS 120 for server 110, connected via network 130. Storage engine 124 may then initiate OS identifier probe 122 to determine the operating system deployed on server 110. Based on the information received from OS identifier probe 122, storage engine 124 may automatically configure the network share on NAS 120 with the appropriate filesystem protocol required for communication with server 110. Furthermore, in an example embodiment, once the share has been configured, storage engine 124 may test the filesystem compatibility between the provisioned network share on NAS 120 and server 110. Lastly, storage engine 124 may provide feedback to the NAS administrator indicating that the network share creation request is complete, identifying the OS deployed on server 110, and summarizing the filesystem compatibility test results. The operations and functions of storage engine 124 are described in further detail below with regard to FIG. 2.

Figure 2:
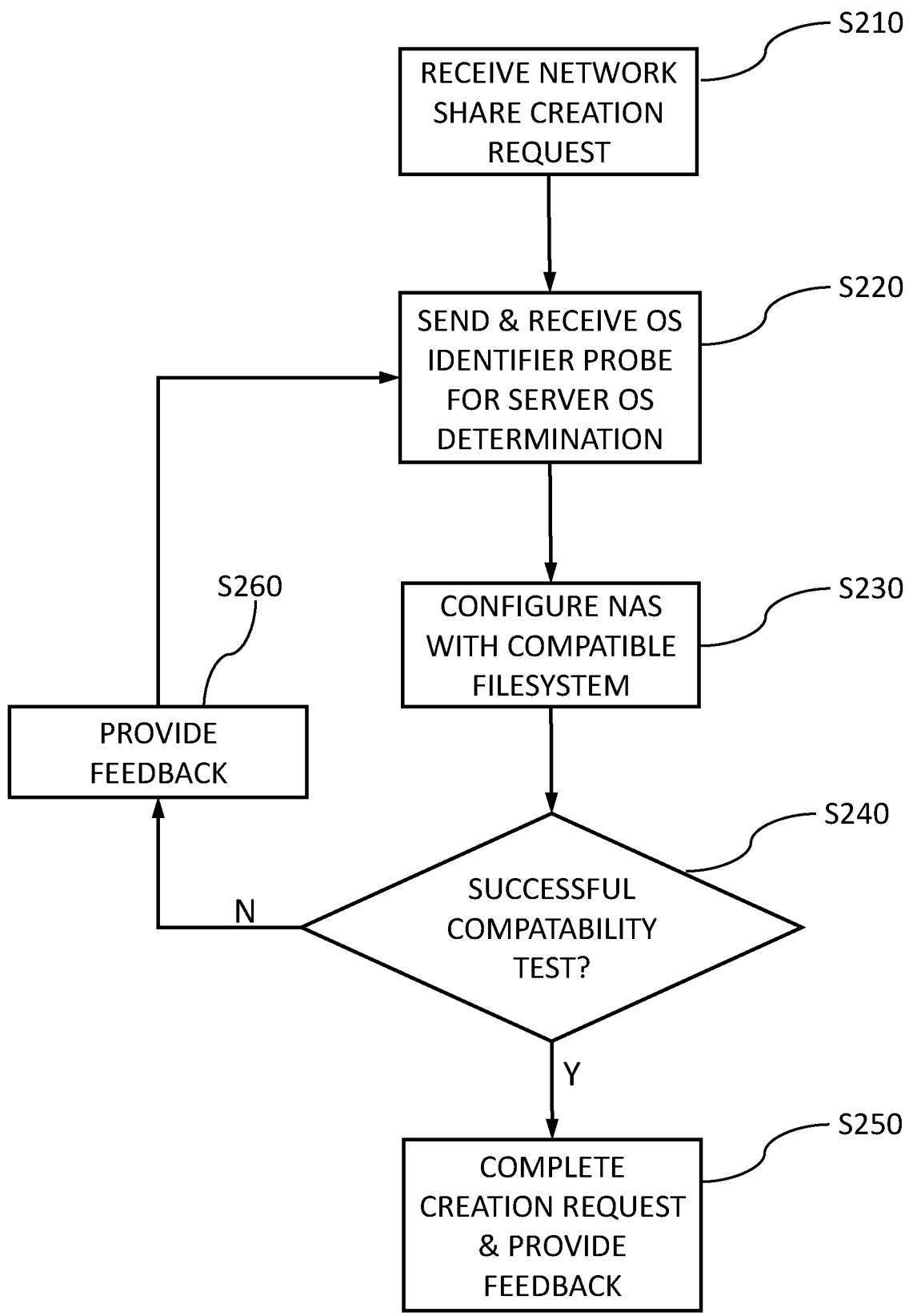
FIG. 2 is a flowchart illustrating the operations of the storage engine of FIG. 1, in accordance with an embodiment of the invention.

FIG. 2 shows a flowchart illustrating the operations of storage engine 124 in accordance with an embodiment of the invention. Referring to step S210, storage engine 124 receives a request to create a network share on NAS 120. The network share creation request may be sent from a NAS administrator seeking to provision a network share for a server connected to the network (e.g. server 110). The network share creation request may also contain information identifying the server for which the network share was requested and specifying the amount of storage space to be partitioned for the network share within NAS 120. In an example embodiment, storage engine 124 may receive a request to provision a network share, of a specified partition size, on NAS 120 for server 110, connected via network 130.

Referring to step S220, in response to receiving a network share creation request, storage engine 124 instructs OS identifier probe 122 to transmit a probe, via network 130, to the server to be provisioned (e.g. server 110). Storage engine 124 may also instruct OS identifier probe 122 to transmit a probe, via network 130, to the server to be provisioned (e.g. server 110) in response to an unsuccessful compatibility test, performed in step S240 below. Storage engine 124 may implement the probe through a SCSI command signal, sent from OS identifier probe 122 on NAS 120, designed to identify the operating system deployed on the server to be provisioned and return the identified operating system back to OS identifier probe 122 for transmission to storage engine 124. Storage engine 124 then receives information from OS identifier probe 122 indicating the operating system deployed on the server for which provisioning of a network share on NAS 120 was requested. In an example embodiment, in response the network share creation request received in step S210, storage engine 124 may instruct OS identifier probe 122 to determine the operating system deployed on server 110. OS identifier probe 122 may then send a SCSI command signal to server 110 which will identify the operating system deployed on server 110 and relay that identification back to OS identifier probe 122. Storage engine 124 may then receive, from OS identifier probe 122, identification of the operating system deployed on server 110.

Referring to step S230, storage engine 124 configures the network share requested for server 110 on NAS 120, based on the operating system identification received in step S220. As part of the configuration, storage engine 124 may create the requested network share within NAS 120 by partitioning the specified amount of storage space for the network share, and selecting the filesystem (i.e. a network file sharing protocol such as NFS or SMB/CIFS) to be utilized within the newly created network share. In an example embodiment, where OS identifier probe 122 identifies the operating system deployed on server 110 as Linux, Unix, or Mac OS, storage engine 124 may configure the partitioned network share on NAS 120 with a network file system (NFS) as the filesystem type. In another example embodiment, where OS identifier probe 122 identifies the operating system deployed on server 110 as Windows, storage engine 124 may configure the partitioned network share on NAS 120 with a common internet file system (CIFS) as the filesystem type.

Referring to step S240, storage engine 124 may test the filesystem compatibility between the created network share on NAS 120 and the server (e.g. server 110) for which the network share was requested. The compatibility test may be implemented through a network ping command, sent from NAS 120, to verify internet protocol connectivity between the requested network share on NAS 120 and the requesting network server (e.g. server 110). If the ping is unsuccessful in that the network server is unable to detect the network share on NAS 120, storage engine 124 may conclude that the requested network share was configured with the incorrect network file sharing protocol and proceed to step S260. If the ping is successful in that the network server is able to detect the network share on NAS 120, storage engine 124 may conclude that the requested network share was configured with the correct network file sharing protocol and proceed to step S250. In an example embodiment, storage engine 124 transmits a ping command to server 110 upon completion of configuring a requested network share on NAS 120. Storage engine 124 receives a successful response from server 110 and concludes that the network share on NAS 120 was configured with the correct network file sharing protocol (i.e. NFS, CIFS). Storage engine 124 then proceeds to step S250.

Referring to step S250, storage engine 124 may provide feedback information to the NAS administrator concerning the requested network share on NAS 120. The feedback information may include status of the network share request, identification of the network server (e.g. server 110) for which the network share was requested, identification of the operating system deployed on the identified network server, the amount of space partitioned for the network share on NAS 120, identification of the network share filesystem selection, and the results of the compatibility test. In an example embodiment, storage engine 124 may provide feedback to the NAS administrator indicating that the status of the network share creation request on NAS 120 is complete. Furthermore, the feedback may also identify server 110 as the network server for which the network share on NAS 120 was requested, identify the operating system deployed on server 110 as Windows, specify the amount of storage space allocated on NAS 120 for the network share, and identify the filesystem selected for the network share as CIFS. Additionally, in an example embodiment, the feedback information may also include the results of the compatibility test between server 110 and the requested network share on NAS 120.

Referring to step S260, storage engine 124 may provide feedback information to the NAS administrator resulting from an unsuccessful compatibility test performed in step S240. The feedback information may include status of the network share request, identification of the network server (e.g. server 110) for which the network share was requested, identification of the operating system deployed on the identified network server, the amount of space partitioned for the network share on NAS 120, identification of the network share filesystem selection, and the results of the compatibility test. Furthermore, in response to an unsuccessful compatibility test, storage engine 124 may return to step S220. In an example embodiment, storage engine 124 provides feedback to the NAS administrator indicating that the status of the network share creation request on NAS 120 is incomplete and proceeds back to step S220.

Figure 3:
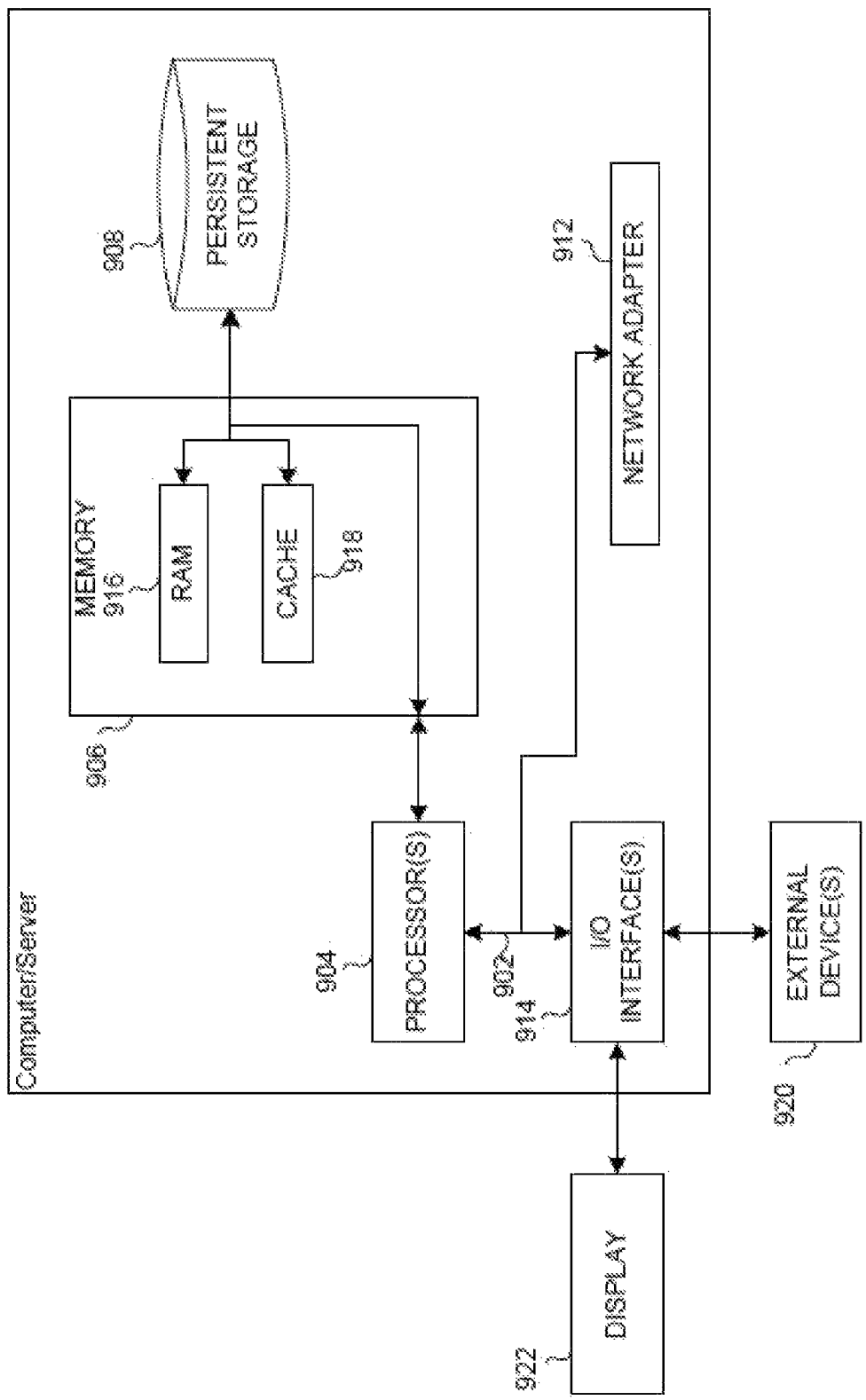
FIG. 3 is a block diagram depicting the hardware components of the network attached storage configuration system of FIG. 1, in accordance with an embodiment of the invention.

FIG. 3 depicts a block diagram of components of server 110 and network attached storage 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 110 and network attached storage 120 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs OS identifier probe 122 and user storage engine 124 in network attached storage 120 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs OS identifier probe 122 and user storage engine 124 in network attached storage 120 may be downloaded to persistent storage 908 through network adapter 912.

I/O interface(s) 914 allows for input and output of data with other devices that may be connected to network attached storage 120 and server 110. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., the programs OS identifier probe 122 and storage engine 124 in network attached storage 120, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
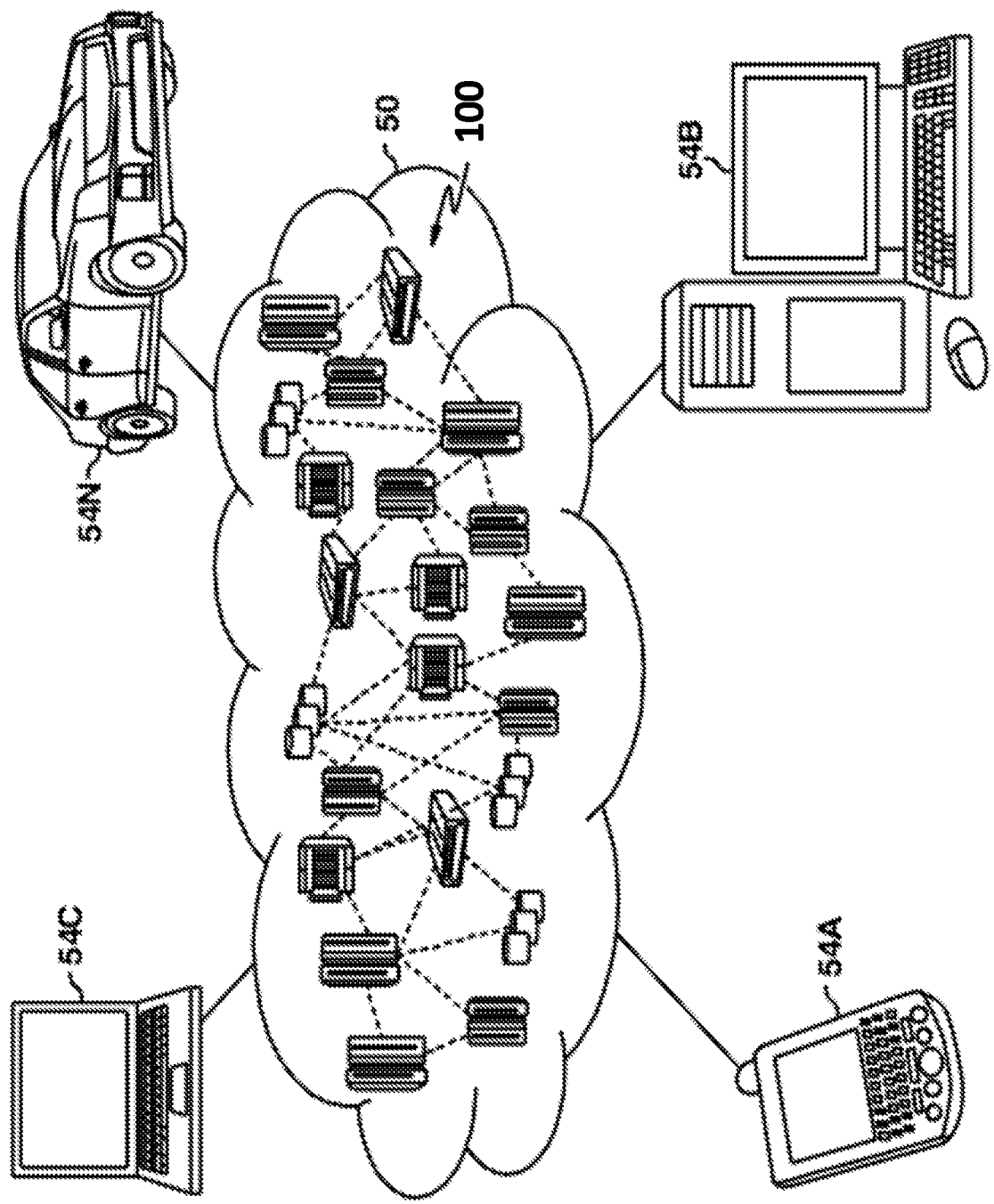
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 5:
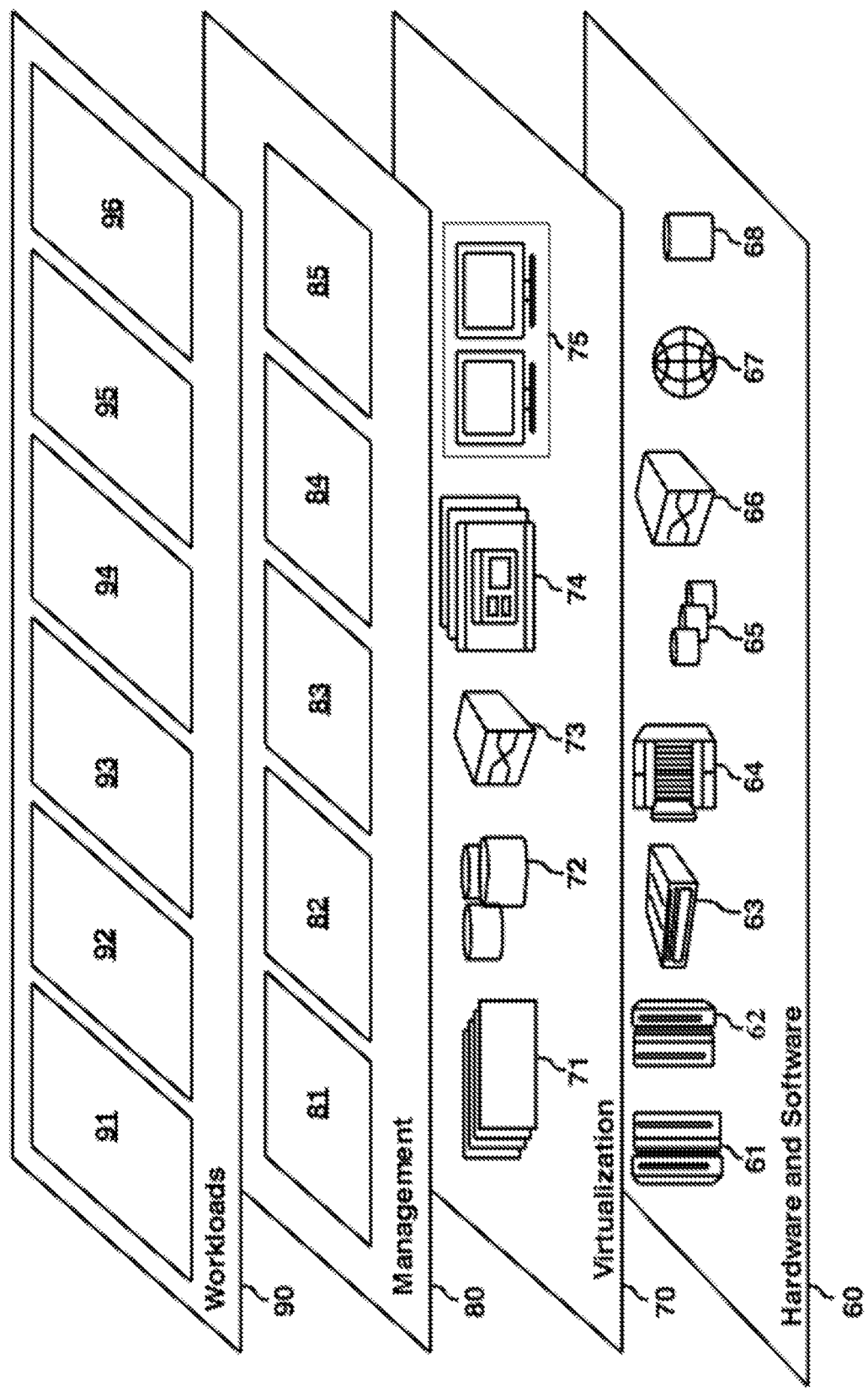
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network attached storage configuration system 96. Network attached storage configuration system 96 may relate to the administration of a network attached storage share.

What is claimed is:

1. A computer-implemented method for network attached storage configuration, the method comprising:
   receiving, by a network attached storage, a request to create a network share on the network attached storage for a network server, wherein the network attached storage and the network server are on a same network;
   based on the received request, transmitting, by the network attached storage, an operating system identifier probe to the network server to identify an operating system deployed on the network server;
   receiving, by the network attached storage, an identification from the operating system identifier probe of the operating system deployed on the network server;
   based on the identified operating system deployed on the network server, configuring, by the network attached storage, the network share on the network attached storage, wherein configuring the network share on the network attached storage comprises formatting a memory location in the network attached storage according to a filesystem type requirement of the identified operating system deployed on the network server and allocating the formatted memory location to the network server; and
   testing, by the network attached storage, compatibility between the network share and network server.

2. The method of claim 1, wherein the request to create a network share on the network attached storage comprises:
   the network server for which the network share was requested; and
   the amount of storage space requested for the network share within the network attached storage.

3. The method of claim 1, wherein transmitting the operating system identifier probe comprises:
   transmitting a small computer system interface (SCSI) command signal from the network attached storage to the network server;
   determining the operating system deployed on the network server; and
   receiving, from the network server, the small computer system interface command signal along with the determined operating system to the network attached storage.

4. The method of claim 1, wherein configuring the network share on the network attached storage further comprises partitioning the requested amount of storage space for the network share within the network attached storage.

5. The method of claim 1, wherein testing compatibility between the network share and network server comprises:
   transmitting a network ping from the network share to the network server; and
   receiving a reply from the network server back to the network share.

6. The method of claim 1, further comprising:
   notifying a network storage administrator of any feedback information resulting from execution of the request to create the network share on the network attached storage for the network server.

7. The method of claim 6, wherein the feedback information comprises an element from the group consisting of:
   a status of the request to create a network share, an identification of the network server, an identification of the operating system deployed on the identified network server, an amount of storage space partitioned for the network share, an identification of the network protocol filesystem selected for the network share, and a result of testing compatibility between the network share and network server.

8. A computer program product for network attached storage configuration, the computer program product comprising:
   one or more computer-readable non-transitory tangible storage devices and program instructions stored on at least one of the one or more tangible storage devices, the program instructions executable by a processor of a computer, the program instructions comprising:
   program instructions to receive, by a network attached storage, a request to create a network share on the network attached storage for a network server, wherein the network attached storage and the network server are on a same network;
   based on the received request, program instructions to transmit, by the network attached storage, an operating system identifier probe to the network server to identify an operating system deployed on the network server;
   program instructions to receive, by the network attached storage, an identification from the operating system identifier probe of the operating system deployed on the network server;
   based on the identified operating system deployed on the network server, program instructions to configure, by the network attached storage, the network share on the network attached storage, wherein program instructions to configure the network share on the network attached storage comprises formatting a memory location in the network attached storage according to a filesystem type requirement of the identified operating system deployed on the network server and allocating the formatted memory location to the network server; and program instructions to test, by the network attached storage, compatibility between the network share and network server.

9. The computer program product of claim 8, wherein the request to create a network share on the network attached storage comprises:
the network server for which the network share was requested; and
the amount of storage space requested for the network share within the network attached storage.

10. The computer program product of claim 8, wherein transmitting the operating system identifier probe comprises:
program instructions to transmit a small computer system interface (SCSI) command signal from the network attached storage to the network server;
program instructions to determine the operating system deployed on the network server; and
program instructions to receive, from the network server, the small computer system interface command signal along with the determined operating system to the network attached storage.

11. The computer program product of claim 8, wherein configuring the network share on the network attached storage further comprises program instructions to partition the requested amount of storage space for the network share within the network attached storage.

12. The computer program product of claim 8, wherein testing compatibility between the network share and network server comprises:
program instructions to transmit a network ping from the network share to the network server; and
program instructions to receive a reply from the network server back to the network share.

13. The computer program product of claim 8, further comprising:
program instructions to notify a network storage administrator of any feedback information resulting from execution of the request to create the network share on the network attached storage for the network server.

14. The computer program product of claim 13, wherein the feedback information comprises an element from the group consisting of:
a status of the request to create a network share, an identification of the network server, an identification of the operating system deployed on the identified network server, an amount of storage space partitioned for the network share, an identification of the network protocol filesystem selected for the network share, and a result of testing compatibility between the network share and network server.

15. A computer system for network attached storage configuration, the computer system comprising:
one or more processors, one or more computer-readable memories, one or more computer-readable tangible storage devices, and program instructions stored on at least one of the one or more storage devices for execution by at least of the one or more processors via at least one of the one or more memories, the program instructions comprising:
program instructions to receive by a network attached storage, a request to create a network share on the network attached storage for a network server, wherein the network attached storage and the network server are on a same network;
based on the received request, program instructions to transmit, by the network attached storage, an operating system identifier probe to the network server to identify an operating system deployed on the network server;
program instructions to receive, by the network attached storage, an identification from the operating system identifier probe of the operating system deployed on the network server;
based on the identified operating system deployed on the network server, program instructions to configure, by the network attached storage, the network share on the network attached storage, wherein program instructions to configure the network share on the network attached storage comprises formatting a memory location in the network attached storage according to a filesystem type requirement of the identified operating system deployed on the network server and allocating the formatted memory location to the network server; and
program instructions to test, by the network attached storage, compatibility between the network share and network server.

16. The computer system of claim 15, wherein the request to create a network share on the network attached storage comprises:
the network server for which the network share was requested; and
the amount of storage space requested for the network share within the network attached storage.

17. The computer system of claim 15, wherein transmitting the operating system identifier probe comprises:
program instructions to transmit a small computer system interface (SCSI) command signal from the network attached storage to the network server;
program instructions to determine the operating system deployed on the network server; and
program instructions to receive, from the network server, the small computer system interface command signal along with the determined operating system to the network attached storage.

18. The computer system of claim 15, wherein configuring the network share on the network attached storage further comprises program instructions to partition the requested amount of storage space for the network share within the network attached storage.

19. The computer system of claim 15, wherein testing compatibility between the network share and network server comprises:
program instructions to transmit a network ping from the network share to the network server; and
program instructions to receive a reply from the network server back to the network share.

20. The computer system of claim 15, further comprising:
program instructions to notify a network storage administrator of any feedback information resulting from execution of the request to create the network share on the network attached storage for the network server.

* * * * *